May 22, 1956 — A. W. HARRIS — 2,746,135
WIRE-REINFORCED RUBBER ARTICLE
AND METHOD OF MAKING THE SAME
Filed Sept. 30, 1947
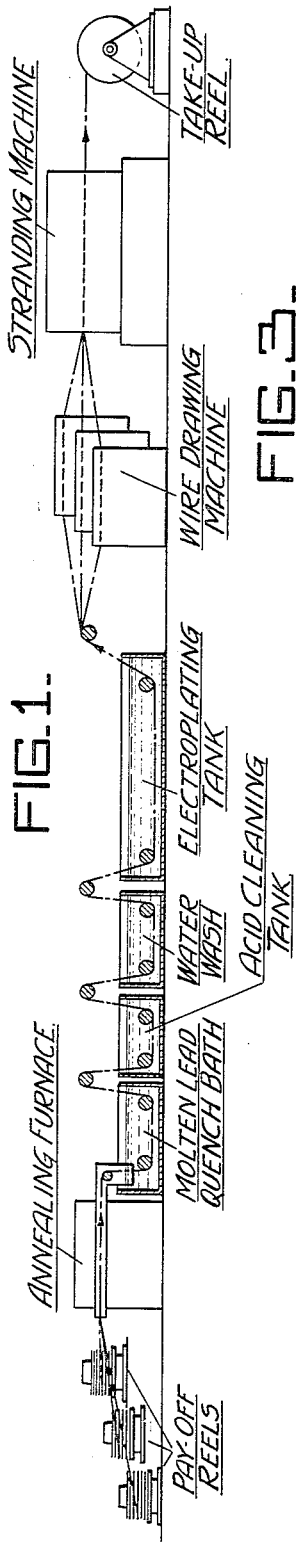
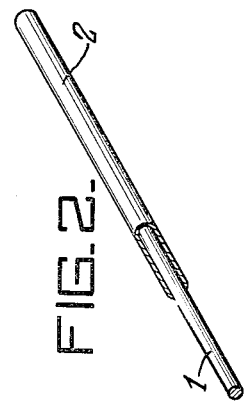
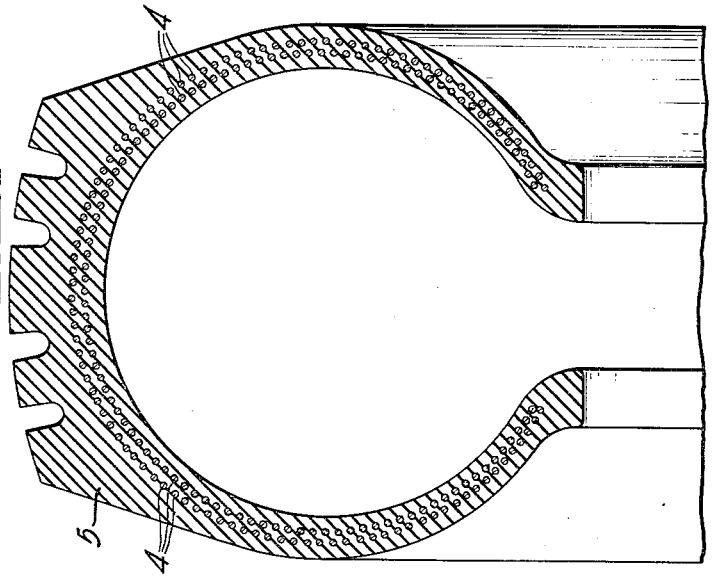
Inventor:
ARCH W. HARRIS,
by: Donald G. Dalton
his Attorney United States Patent Office 2,746,135
Patented May 22, 1956

2,746,135

WIRE-REINFORCED RUBBER ARTICLE AND
METHOD OF MAKING THE SAME

Arch W. Harris, Euclid, Ohio, assignor to United States Steel Corporation, a corporation of New Jersey Application September 30, 1947, Serial No. 777,118

10 Claims. (Cl. 29—195)

This invention relates to the production of steel products having good rubber adhesion characteristics for reenforcing rubber articles, such as tire wire used in forming strands for strengthening rubber tires.

Heretofore, tire cord wire strands have been made by double lead patenting or annealing high carbon steel wire and after acid cleaning it, giving it a chemical dip copper coating following which the plated wire was cold drawn to size, and then stranded. The strands were then brass plated, washed, dried and spooled. The strands so-produced were then used for reenforcing rubber tires. This method has a number of disadvantages. The primary disadvantage is that it makes it impossible to closely control the brass coating within 65 to 75% copper, 25 to 35% zinc, brass composition desired, since the copper coating used for lubrication tends to change the analysis of the brass coating a variable amount. The ultimate adhesion of the rubber to the strands depends, to a great extent, on the surface of the steel, or rather the adherence of the brass plating to the copper coating on the steel base. Most chemical-dipped copper coatings on the high carbon steels used have a smut underneath the coating which adversely affects its adhesion to the steel. In addition, uniform adhesion of the rubber to the brass-plated cord also depends on the porosity of the brass plating and the amount the surface has tarnished due to the minute amounts of electrolyte absorbed thereby. In addition, the washing and drying further tarnishes the brass and this very seriously detracts from the adhesion of rubber to the brass.

It is accordingly among the objects of the present invention to overcome the foregoing disadvantages and provide tire wire and strands formed therefrom that provide a uniformly good rubber adherence.

A further object is to produce tire wire more efficiently and economically than was heretofore possible.

My improved method and the article resulting therefrom will be more clearly understood from the following description thereof when read in conjunction with the attached drawing wherein:

Figure 1 is a schematic or diagrammatic illustration of the wire treating steps of my invention;

Figure 2 is an enlarged view of a section of coated wire with a portion of the coating removed to show the base;

Figure 3 is a cross-section of a tire casing having two plys of stranded wire structure.

High carbon steel wire 1 containing between about .50 and 1.00% carbon, .60 and 1.25% manganese, and other elements in the usual residual amounts is drawn to "process" size. Process size is the gauge or size at which the wire is given the final patent anneal and the wire in process size has a scale-free surface resulting from previous drawings. This wire is then patent annealed, preferably by continuously heating it in a nonoxidizing atmosphere (which may be composed of any inert gas such as nitrogen, helium and argon or other gases, such as cracked ammonia, etc.), to a temperature between 1450° and 1900° F. after which, without exposure to any oxidizing influences, it is continuously quenched in a lead bath maintained at a temperature between 800° and 1100° F. A suitable heating furnace may be about 20 feet long for a rate of travel of 85 feet per minute and the lead pan may be about 18 feet long. Patent annealing in this manner produces a thin film of ferrous oxide on the wire which is easily and completely removed in a conventional hydrochloric or other acid pickling bath to produce a surface equivalent to the cold drawn surface. Following this, the cleaned wire is electroplated with a predominately copper or copper base alloy to produce a coating 2 thereon of 1.0 to 50 grams and preferably between 1.5 to 3.5 per kilo of wire. The coating may contain between 50 and 95% copper and 5 to 50% of a metal of the class of zinc and tin. That is, the coating may contain 50 to 90% copper and 10 to 50% zinc or 80 to 95% copper and 5 to 20% tin. The preferred coating contains 65 to 75% copper and 25 to 35% zinc. Following this, the wire with the electroplated predominately copper coating thereon is cold drawn, preferably on a continuous wire drawing machine to reduce the cross-section thereof by at least 10%, and preferably to a gauge of about .0059". This compacts the coating 2, gives it a smooth continuous surface, removes any electrolyte therefrom and raises the tensile strength of the wire to between 250,000 and 425,000 pounds per square inch. The wire so treated can then be stranded, i. e. formed into strands containing a plurality of wires, and rubber vulcanized thereto with the desired improvements in adhesion.

While the above described method of patenting is not essential to the general method, it is desirable in that the oxide is easily and quickly removed without causing acid embrittlement and thereby eliminates the conventional baking treatment to eliminate acid embrittlement. The predominately copper plating forms a good lubricant equal to any coating for die lubrication purposes. The cold drawing densifies and hardens the predominately copper coating. A uniform smooth surface is produced by the pressure of the drawing die thereby obtaining a minimum surface area per unit volume and to that extent reduces the tendency of the surface to tarnish. Moreover, the plated drawn wire so-produced need not be washed and dried before stranding thereby eliminating the chief cause of undesirable tarnishing. Due to the uniform smooth surface on the wire, the chemical reactivity of the sulphur in the rubber with the copper in the coating can be carefully controlled to produce a uniform adhesion of rubber to the coating. The coating is in turn tightly bonded to the steel of the wire. Also as before stated, the analysis of the coating can be closely controlled due to the elimination of the conventional copper undercoat.

While I have described several specific embodiments of my invention, it will be understood that these embodiments are merely for the purpose of description and that various other forms may be devised within the scope of my invention, as defined in the appended claims.

I claim:

1. A rubber article reenforced with a stranded wire structure comprising a plurality of wires, the wires of said structure being composed of a base of high carbon steel containing between .50 and 1.00% carbon and having a tensile strength between 250,000 and 425,000 pounds per square inch and a uniform cold-drawn coating of electrodeposited as such copper base alloy directly bonded thereto, said alloy containing between 50 and 95% copper and between 5 and 50% of a metal of the class of zinc and tin, said coating containing between 50 and 90% copper when the metal of the class of zinc and tin is zinc and between 80 and 95% copper when the metal of the class of zinc and tin is tin, said coating having a smooth continuous surface, a dense, cold-worked structure and a weight between 1 and 50 grams per kilogram of base metal.

2. In a method of bonding rubber to steel wire the steps including electrodepositing as such a layer of brass on the wire, the brass having a composition in which its copper content is in the range of 55 to 75%, reducing the size of the brass plated wire in a drawing operation, embedding the coated wire in a vulcanizable rubber composition, and vulcanizing the rubber composition in direct contact with the surface of the drawn brass plated wire.

3. The method of bonding rubber to metal comprising the steps, selecting a wire of steel having a diameter greater than the diameter ultimately required in the bonded assembly, electrodepositing as such a layer of brass containing 55 to 75% of copper on the wire, reducing the size of the brass plated wire in a drawing operation, and subsequently twisting a plurality of the coated wire filaments together to form a strand, embedding the coated strand in a vulcanizable rubber composition and vulcanizing the rubber composition in direct contact with the surface of the drawing brass plated wire.

4. The method of bonding rubber to steel wire comprising the steps, electrodepositing as such a layer of brass containing 55 to 75% of copper on the wire, reducing the size of the wire in a drawing operation and simultaneously reducing the thickness of brass deposit on the wire, embedding the coated wire in a vulcanizable rubber composition, and vulcanizing the rubber composition in direct contact with the surface of the drawn brass plated wire.

5. In a method of bonding rubber to steel wire the steps including electrodepositing as such a coating of copper-base alloy on the wire, the coating containing between 50 and 95% copper and between 5 and 50% of a metal of the class of zinc and tin, said coating containing between 50 and 90% copper when the metal of the class of zinc and tin is zinc and between 80 and 95% copper when the metal of the class of zinc and tin is tin, reducing the size of the copper alloy plated wire in a drawing operation, embedding the coated wire in a vulcanizable rubber composition, and vulcanizing the rubber composition in direct contact with the surface of the drawn copper alloy plated wire.

6. The method of bonding rubber to metal comprising the steps, selecting a wire of steel having a diameter greater than the diameter ultimately required in the bonded assembly, electrodepositing as such a coating of copper-base alloy on the wire, the coating containing between 50 and 95% copper and between 5 and 50% of a metal of the class of zinc and tin, said coating containing between 50 and 90% copper when the metal of the class of zinc and tin is zinc and between 80 and 95% copper when the metal of the class of zinc and tin is tin, reducing the size of the copper-base alloy plated wire in a drawing operation, and subsequently twisting a plurality of coated wire filaments together to form a strand, embedding the coated strand in a vulcanizable rubber composition and vulcanizing the rubber composition in direct contact with the surface of the drawn copper-base alloy plated wire.

7. The method of bonding rubber to steel wire comprising the steps, electrodepositing as such a coating of copper-base alloy on the wire, said coating containing between 50 and 95% copper and between 5 and 50% of a metal of the class of zinc and tin, said coating containing between 50 and 90% copper when the metal of the class of zinc and tin is zinc and between 80 and 95% copper when the metal of the class of zinc and tin is tin, reducing the size of the coated wire in a drawing operation and simultaneously reducing the thickness of copper alloy deposit on the wire, embedding the coated wire in a vulcanizable rubber composition, and vulcanizing the rubber composition in direct contact with the surface of the drawn copper alloy plated wire.

8. In a method of bonding rubber to steel wire the steps including electrodepositing as such a layer of brass on the wire, the brass having a composition in which its copper content is in the range of 65 to 75%, reducing the size of the brass plated wire in a drawing operation, embedding the coated wire in a vulcanizable rubber composition, and vulcanizing the rubber composition in direct contact with the surface of the drawn brass plated wire.

9. The method of bonding rubber to metal comprising the steps, selecting a wire of steel having a diameter greater than the diameter ultimately required in the bonded assembly, electrodepositing as such a layer of brass containing 65 to 75% of copper on the wire, reducing the size of the brass plated wire in a drawing operation, and subsequently twisting a plurality of the coated wire filaments together to form a strand, embedding the coated strand in a vulcanizable rubber composition and vulcanizing the rubber composition in direct contact with the surface of the drawn brass plated wire.

10. The method of bonding rubber to steel wire comprising the steps, electrodepositing as such a layer of brass containing 65 to 75% of copper on the wire, reducing the size of the wire in a drawing operation and simultaneously reducing the thickness of brass deposit on the wire, embedding the coated wire in a vulcanizable rubber composition, and vulcanizing the rubber composition in direct contact with the surface of the drawn brass plated wire.

References Cited in the file of this patent

UNITED STATES PATENTS

| | | |
|---|---|---|
| 618,079 | Fark | Jan. 24, 1899 |
| 802,692 | Horton | Oct. 24, 1905 |
| 1,924,099 | Bain | Aug. 29, 1933 |
| 2,002,261 | Domm | May 21, 1935 |
| 2,002,263 | Domm | May 21, 1935 |
| 2,078,917 | Malone | Apr. 27, 1937 |
| 2,288,762 | Winkler | July 7, 1942 |
| 2,323,890 | Adler | July 13, 1943 |
| 2,370,973 | Lang | Mar. 6, 1945 |
| 2,420,291 | Adler | May 13, 1947 |
| 2,424,173 | Huston et al. | July 15, 1947 |
| 2,490,700 | Nachtman | Dec. 6, 1949 |

OTHER REFERENCES

The Alloys of Iron and Carbon, vol. I, Constitution, by Samuel Epstein, 1st Ed., McGraw-Hill Book Co., New York, 1936, pp. 332–334.

Gurney: "Adhesion of Rubber to Brass Plate," Trans. Inst. of the Rubber Industry, September 1945, pp. 31–40.